(12) United States Patent
Kaye et al.

(10) Patent No.: US 8,294,417 B2
(45) Date of Patent: Oct. 23, 2012

(54) CHARGING AND SECURITY STATION FOR MULTIPLE WIRELESS TABLETS

(75) Inventors: Stephen T. Kaye, Ellicott City, MD (US); David F. Maltais, Phoenix, AZ (US)

(73) Assignee: Einstruction Corporation, Denton, TX (US)

( * ) Notice: Subject to any disclaimer, the term of this patent is extended or adjusted under 35 U.S.C. 154(b) by 372 days.

(21) Appl. No.: 12/435,460

(22) Filed: May 5, 2009

(65) Prior Publication Data
US 2009/0278495 A1    Nov. 12, 2009

Related U.S. Application Data

(60) Provisional application No. 61/071,653, filed on May 9, 2008.

(51) Int. Cl.
*H02J 7/00* (2006.01)
(52) U.S. Cl. .................. 320/108; 320/110; 320/114
(58) Field of Classification Search .......... 320/107–115, 320/124, 125
See application file for complete search history.

(56) References Cited

U.S. PATENT DOCUMENTS

| | | | |
|---|---|---|---|
| 5,180,891 A | | 1/1993 | Trumbo |
| 5,780,991 A | * | 7/1998 | Brake et al. .................. 320/112 |
| 6,002,236 A | * | 12/1999 | Trant et al. .................... 320/114 |
| 6,116,762 A | * | 9/2000 | Kutlucinar .................... 362/500 |
| 6,204,632 B1 | * | 3/2001 | Nierescher et al. ........... 320/116 |
| 7,116,079 B2 | * | 10/2006 | Bayne et al. ................ 320/116 |
| 7,200,965 B2 | * | 4/2007 | Vor Keller et al. ........... 42/70.11 |
| 7,480,139 B2 | * | 1/2009 | Ryder et al. ............. 361/679.01 |
| 7,626,358 B2 | * | 12/2009 | Lam et al. ..................... 320/114 |
| 2006/0044286 A1 | * | 3/2006 | Kohlhaas et al. ............. 345/173 |
| 2007/0114969 A1 | * | 5/2007 | Marmaropoulos .......... 320/108 |
| 2008/0067975 A1 | * | 3/2008 | Law .............................. 320/110 |

OTHER PUBLICATIONS

PCT Search Report & Written Opinion in PCT/US09/42774 dated Jun. 30, 2009.
International Preliminary Report on Patentability in PCT/US2009/042774, dated Nov. 9, 2010.

* cited by examiner

*Primary Examiner* — Patrick Assouad
*Assistant Examiner* — Alesa Allgood
(74) *Attorney, Agent, or Firm* — Manelli Selter PLLC; Edward J. Stemberger

(57) ABSTRACT

A charging station (10) for wireless digitizer tablets (12) includes a housing (11), and a plurality of tablet receiving areas (20) associated with the housing. Each tablet receiving area is constructed and arranged to receive a wireless digitizer tablet for docking therein. A charging connector (24) is associated with each tablet receiving area and is constructed and arranged to be connected with an associated tablet for charging at least one battery of the associated tablet. A power cord structure (26) is electrically connected with each charging connector such that when the power cord structure is connected with a source of power, the power cord structure delivers electrical current to each charging connector substantially simultaneously.

18 Claims, 5 Drawing Sheets

CHARGING AND SECURITY STATION FOR MULTIPLE WIRELESS TABLETS

This application is based on U.S. Provisional Application No. 61/071,653 filed on May 9, 2008, claims the benefit thereof for priority purposes, and is hereby incorporated by reference into this specification.

FIELD

The subject matter relates to a multi-user system employing portable digitizers or graphic tablets that is configured to support student-centered, collaborative learning and, more particularly, to a charging-docking station for the tablets.

BACKGROUND

U.S. Pat. No. 6,930,673, the content of which is hereby incorporated into this specification by reference, discloses a collaborative input system particularly useful in a school setting where both teacher and students can concurrently interact with and contribute to the same digital content. The teacher employs a wireless digitizer tablet and the students also use wireless digitizer tablets. Since the digitizer tablets are portable and thus battery operated, charging of these tablets is required. Typically, charging involves attaching a DC converter/power cord to each tablet and plugging each power cord into a standard 110 volt AC outlet. Such charging increases cost due to the need to provide a DC converter and power cord with each tablet. Furthermore, since there is no way to secure or lock the tablets while charging, theft of the devices can occur.

Thus, there is a need to provide a charging and security station to charge the batteries of a plurality of wireless digitizer tablets simultaneously in a secure manner.

SUMMARY

An object of the present invention is to fulfill the need referred to above. In accordance with the principles of an embodiment, this objective is obtained by providing a charging station for wireless digitizer tablets. The station includes a housing, and a plurality of tablet receiving areas associated with the housing. Each tablet receiving area is constructed and arranged to receive a wireless digitizer tablet for docking therein. A charging connector is associated with each tablet receiving area and is constructed and arranged to be connected with an associated tablet for charging at least one battery of the associated tablet. A power cord structure is electrically connected with each charging connector such that when the power cord structure is connected with a source of power, the power cord structure delivers electrical current to each charging connector substantially simultaneously.

In accordance with another aspect of an embodiment, a method of securely charging multiple wireless digitizer tablets provides a first charging station having a single power cord structure. Multiple wireless digitizer tablets are electrically connected to the first charging station so that when the power cord structure is connected with a power source, the charging station charges at least one battery of each tablet substantially simultaneously. Each tablet is secured to the charging station during charging.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXAMPLE EMBODIMENTS

Figure 1:
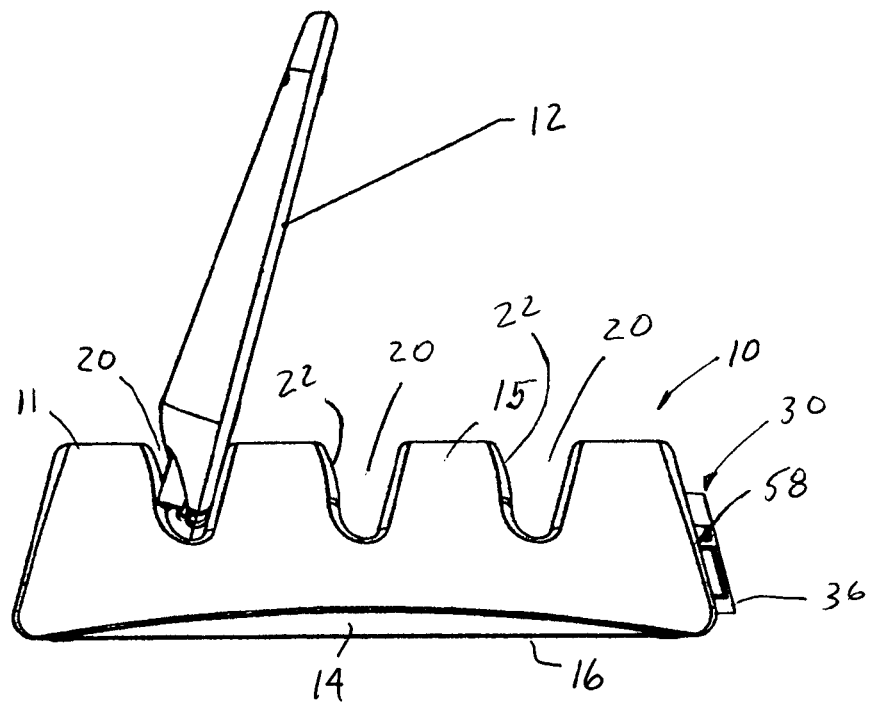
FIG. 1 is a side view of a charging and security station for a plurality of wireless digitizer tablets shown with one digitizer tablet docked therein.
Figure 2:
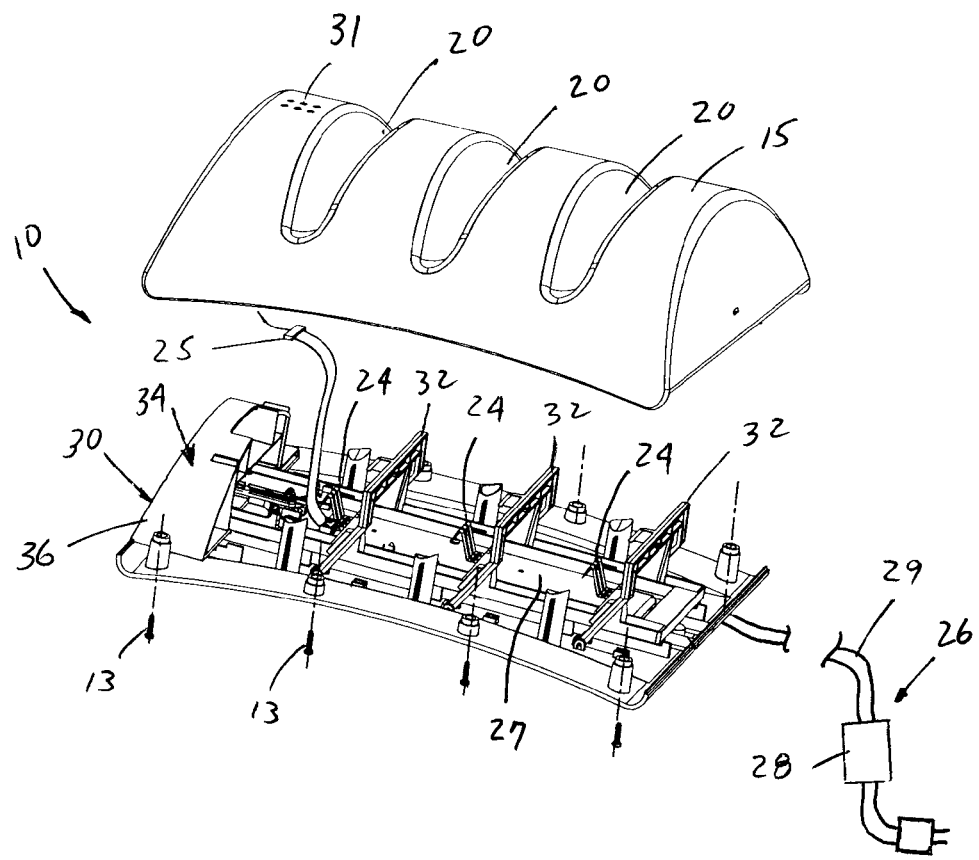
FIG. 2 is an exploded view of the charging and security station of FIG. 1 showing the base and cover thereof.

Referring to FIGS. 1 and 2, a charging and security station is shown, generally indicated at 10, for docking and charging wireless digitizer tablets 12 in a secure manner. The station 10 includes a housing 11 comprised of a base 14 and a cover 15, coupled by screws 13 or the like to the base 14. The base 14 has a support surface 16 that is generally planar so as to be able to rest on a desktop surface or to be mounted on a wall.

The cover 15 includes a plurality of a tablet receiving areas 20, with each area 20 being constructed and arranged to receive a portable digitizer tablet 12 for docking and charging therein. As best shown in FIG. 1, in the illustrated embodiment, three areas 20 are provided and are defined by slots 22 in the cover 15. At least two areas 20, or more than three areas 20 can be provided in the cover 15. As an example, the charging station 10 and tablets 12 can be of the type in the Interwrite® Mobi System manufactured by eInstruction™.

With reference to FIG. 2, a charging connector 24 is associated with, and accessible at, each tablet receiving area 20 once the cover 15 is attached to the base 14. Each charging connector 24 is constructed and arranged to be connected with a connector of an associated tablet 12 for charging at least one battery of the associated tablet 12. A power cord structure, generally indicated at 26, is electrically connected with each charging connector 24 via connector circuit board 27. The circuit board 27 and charging connectors 24 can be considered to be part of the power cord structure 26. The power cord structure 26 includes an AC to DC converter 28 in cord 29 such that when the power cord structure 26 is connected with a source of power such as a 110V AC source, DC electrical current is delivered to each charging connector 24 substantially simultaneously. Thus, batteries of each tablet 12 connected with a charging connector 24 are charged substantially simultaneously. Advantageously, a single power cord structure connected to a single power source can charge multiple tablets 12. A cable 25 is connected between the circuit board 27 and LED indicators 31 to power the LED indicators 31. The indicators 31 are visible through the cover 15 and indicate charging status of the tablets 12.

Since the tablets 12 are typically used in a classroom setting, it is important to secure or lock the tablets to the station 10 when not in use and/or when charging. Thus, as shown in FIG. 1, the station 10 includes an integrated locking structure, generally indicated at 30. When the tablets 12 are received in the tablet receiving areas 20, the locking structure 30 is constructed and arranged to preferably, simultaneously lock the tablets 12 to the housing 11. More particularly, and with reference to FIG. 2, the locking structure 30 includes locking mechanisms 32, associated with each tablet receiving area 20, and an actuator, generally indicated at 34, for actuating the mechanisms 32.

Figure 3:
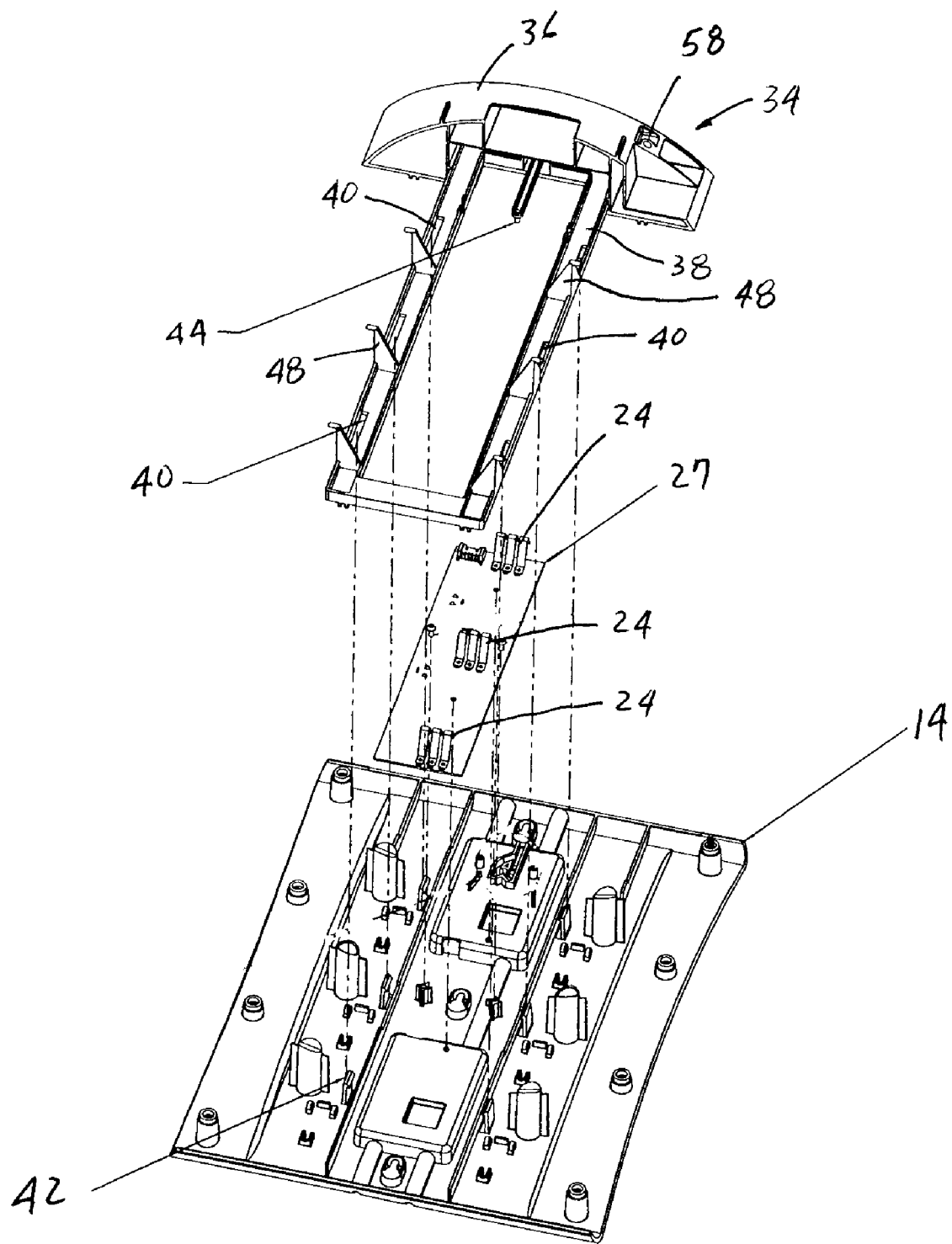
FIG. 3 is an exploded view of the actuator for actuating locking structure of the charging and security station.

With reference to FIG. 3, in the embodiment, the actuator 34 includes a depressible button portion 36 constructed and arranged to be moved manually to move the locking mechanisms 32 (FIG. 2) between locked and unlocked states as will be explained below. In particular, the actuator 34 has a frame 38 that includes a plurality of slots 40 there-through. The base 14 includes upstanding tabs 42. A tab 42 is received in each slot 40 such that the actuator 34 is mounted to the base 14 so as to be capable of moving linearly, between opened and closed states, in the directions indicated by arrow A in FIG. 4. The frame 38 also includes upstanding slide features 48, the function of which will be explained below. A toggle pin 44 of the actuator 34 is engaged with a cam feature 46 of the base 14. The cam feature 46 positions the actuator via the toggle pin 44 in either an open or closed state thereof as will be explained more fully below.

Figure 4:
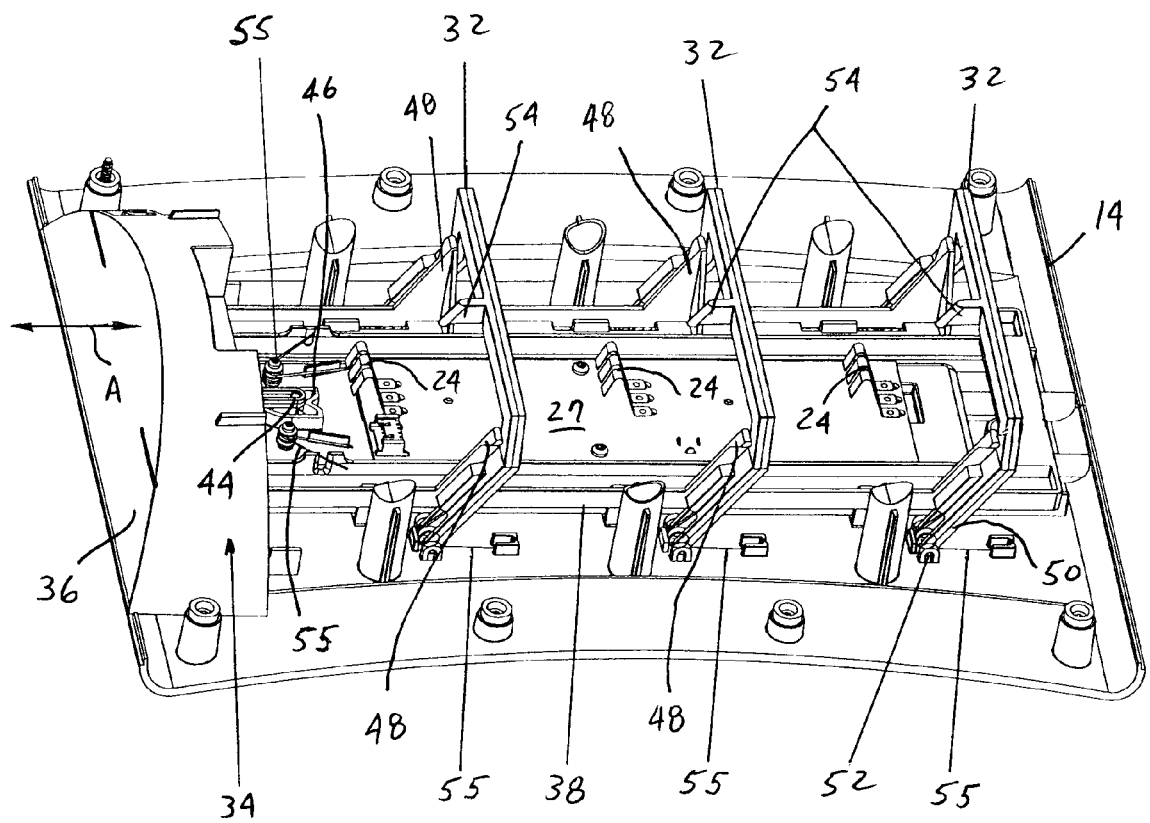
FIG. 4 is an enlarged view of the base of the charging and security station of FIG. 2.
Figure 5:
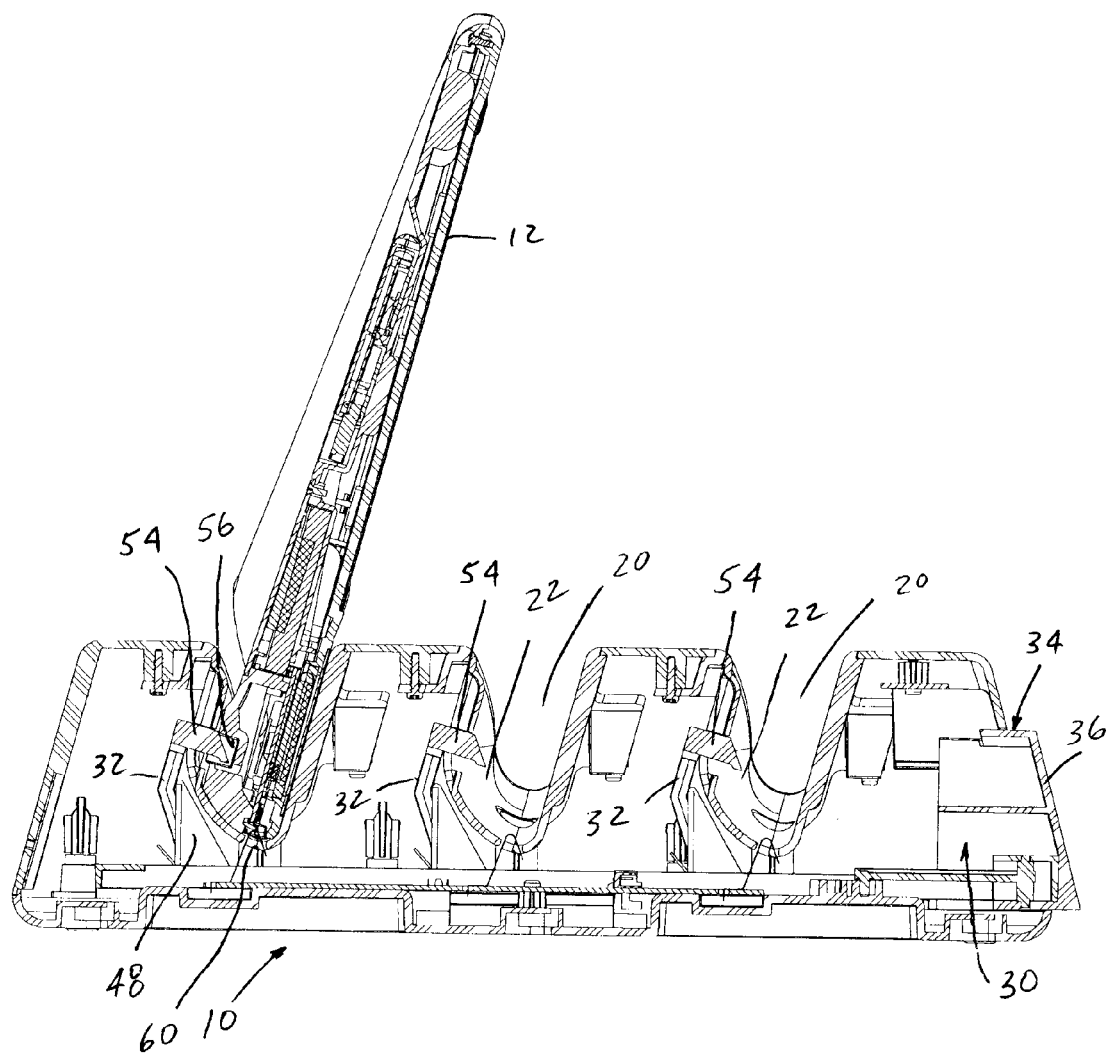
FIG. 5 is side sectional view of the charging and security station showing a tablet locked therein.

As shown in FIG. 4, ends 50 each locking mechanism 32 are coupled to features 52 on the base 14 so that each locking mechanism 32 can pivot with respect to the base 14. A pair of slide features 48 is operatively associated with each locking mechanism 32 such that when the button portion 36 is pushed, causing the actuator 34 to move linearly, the slide features 48 cause each locking mechanism 32 rotate simultaneously from an unlocked state to a locked state. With reference to FIGS. 4 and 5, each locking mechanism 32 includes an engagement member, preferably in the form of a hook 54 that engages a slot 56 in an associated tablet 12 in the locked state of the locking mechanisms 32 to secure the tablet 12 to the station 10. A torsion spring 55 is associated with each locking mechanism 32 and with the frame 38 to provide spring force resistance to the actuator 34.

Thus, the button portion 36 is pushed inwardly and the pin 44 in the cam feature 46 stops the movement of the actuator 34 in the tablet unlocked state. The button portion 36 is disposed completely within the cover 15 in this unlocked state. When the button portion 36 is pushed inwardly again, the pin 44 moves in the cam feature 46 to release the actuator 34 and permit the button portion 36 to extend outwardly from the cover 15 (FIGS. 1 and 5). This motion positions the hooks 54 to lock the tablets 12 in the station 10.

With reference to FIG. 1, in the locked state, a hole 58 in the button portion 36 is now accessible just outside of the cover 15 and is configured to receive a padlock (not shown) that prevents the button portion 36 from being pushed back in to unlock the tablets 12. Alternatively, the button portion 36 could have a key type lock to lock the button portion 36 with respect to the cover 15 in the extended, locked position. Once the padlock is removed, the button portion 36 can be pushed inwardly with the actuator 34 moving the locking members to the unlocked state.

It can be appreciated that if desired, the tablets 12 need not be locked to the base when charging or docked. Also, although the locking structure 30 is disclosed as locking tablets 12 in a simultaneous manner, it can be appreciated that the locking structure 30 can be provided to individually lock (e.g. non simultaneously) each tablet 12 to the housing 11.

With reference to FIG. 5, the tablets 12 include an opening 60 for receiving and storing a digitizer pen therein. The pen is used in operating the tablet 12. When the tablet 12 is locked in the station 10, the pen is in the slot 22 of the station 10 and is not accessible. Thus, when the tablet 12 is locked in the station 10, the pen is also secured.

Figure 6:
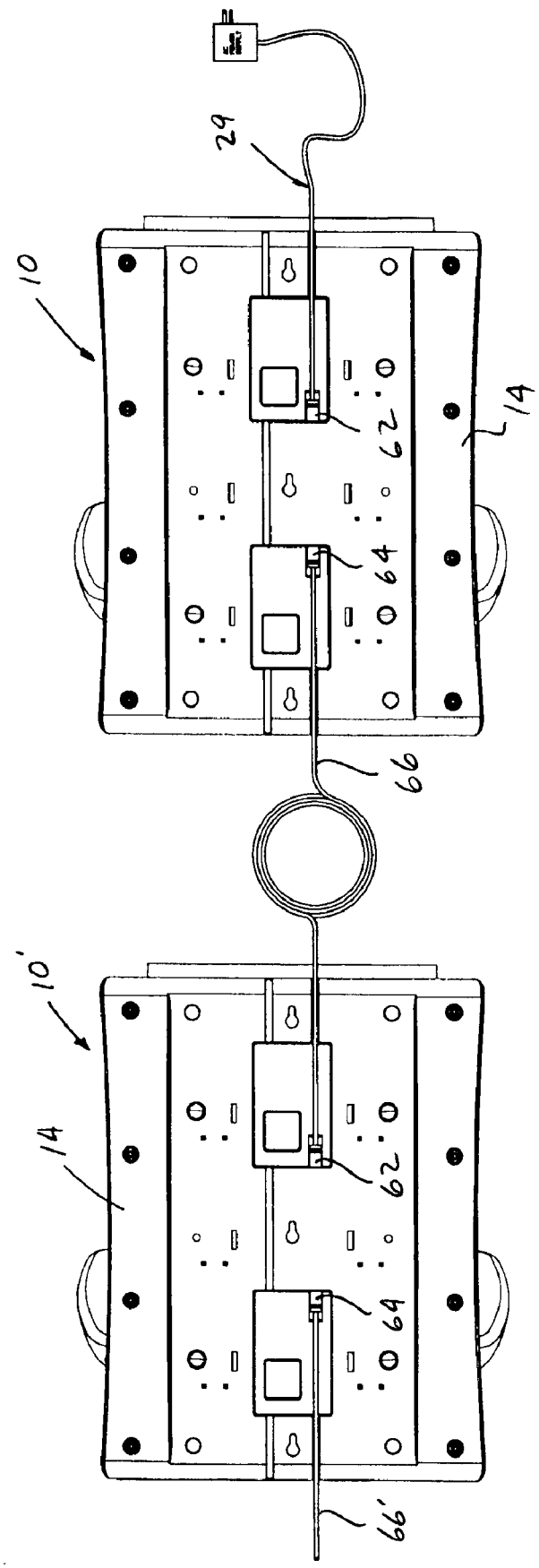
FIG. 6 is rear view of a pair of charging and security stations shown joined together in a daisy chain manner so that one stations powers the other station.

With reference to FIG. 6, a rear view of power of stations 10, 10' is shown with each station 10, 10' including a first power connector 62 and a second power connector 64, each of which is electrically connected with the circuit board 27 (FIG. 4). For station 10, connector 62 receives the power cord structure 29 and connector 64 receives DC power that is supplied by the power cord structure 29. Thus, when one end of a power transfer cord 66 is coupled with the connector 64 of station 10 and the other end of the power transfer cord 66 is connected to the connector 62 of station 10', only one power cord structure 29 powers multiple stations 10, 10' in a daisy chain manner. Station 10' can power yet another station (not shown) by employing a second power transfer cord 66'.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A charging station for wireless digitizer tablets comprising:
   a housing,
   a plurality of tablet receiving areas associated with the housing, each tablet receiving area being constructed and arranged to receive a wireless digitizer tablet for docking therein,
   a charging connector associated with each tablet receiving area, each charging connector being constructed and arranged to be connected with an associated tablet for charging at least one battery of the associated tablet,
   a power cord structure electrically connected with each charging connector such that when the power cord structure is connected with a source of power, the power cord structure delivers electrical current to each charging connector substantially simultaneously, and
   locking structure constructed and arranged such that when the tablets are received in the tablet receiving areas, a single actuation of the locking structure substantially simultaneously causes engagement of the locking structure with a portion of each tablet to lock the tablets to the housing to discourage theft of the tablets.

2. The station of claim 1, wherein the source of power is AC current, and wherein the power cord structure includes an AC to DC converter to deliver DC electrical current.

3. The station of claim 1, wherein the housing includes a support surface constructed and arranged to be able to rest on a surface or to be mounted to a wall.

4. The station of claim 1, wherein the charging connectors are part of the power cord structure.

5. The station of claim 1, further including LED indicators constructed and arranged to indicate charging status of the tablets.

6. The station of claim 1, further comprising first and second power connectors, the first power connector receiving the power cord structure for delivering the current to the charging connectors, the second power connector receiving DC power supplied by the power cord structure, the second power connector is constructed and arranged to receive an end of a power transfer cord so that when another end of the power transfer cord is connected with one of the power connectors of a second station, the second station can be powered in a daisy chain manner from the station to which it electrically connected via the power transfer cord.

7. The station of claim 1, in combination with at least one tablet associated with a tablet receiving area.

8. The combination of claim 7, wherein the tablet has an opening therein for receiving a digitizer pen for storage, wherein when the tablet is in the tablet receiving area, the opening is not accessible.

9. The station of claim 1, in combination with a tablet received in each tablet receiving area.

10. The combination of claim 9, wherein three tablets are provided.

11. The station of claim 1, wherein the locking structure comprises a locking mechanism, associated with each tablet receiving area, and a single actuator, each locking mechanism being constructed and arranged to engage the portion of an associated tablet when the tablet is received in the tablet receiving area, the single actuator being constructed and arranged to be manually moved to move the locking mechanisms substantially simultaneously between locked and unlocked states, such that in the locked state, each locking mechanism engages the portion of the associated tablet securing the tablet with respect to the housing and in the unlocked state, each locking mechanism disengages from the portion of the associated tablet.

12. The station of claim 11, wherein the actuator includes a button portion that is accessible for manual movement thereof, wherein in the locked state, at least a part of the button portion extends from the housing, the button portion including features for receiving a padlock such that when a padlock is secured to the button portion, the button portion cannot move linearly and thus maintains the locking mechanisms in the locked state.

13. The station of claim 11, wherein the actuator is constructed and arranged to move linearly and the locking mechanisms are constructed and arranged to rotate with respect to the housing, with the linear movement of the actuator causing rotation of the locking mechanisms.

14. The station of claim 13, wherein each locking mechanism includes an engagement member constructed and arranged to engage with a portion of an associated tablet in the locked state thereof.

15. A method of securely charging multiple wireless digitizer tablets, the method comprising:
providing a first charging station having a single power cord structure,
electrically connecting multiple wireless digitizer tablets to the first charging station so that when the power cord structure is connected with a power source, the charging station charges at least one battery of each tablet substantially simultaneously, and
causing a single actuation of locking structure to substantially simultaneously cause engagement of the locking structure with a portion of each tablet, locking each tablet to the charging station while charging each tablet to discourage theft of the tablets.

16. The method of claim 15, wherein the charging station has a housing including a plurality of a tablet receiving areas, each tablet receiving area receiving a wireless digitizer tablet, the power cord structure including a charging connector associated with each tablet receiving area,
wherein the connecting step including connecting each charging connector with an associated tablet.

17. The method of claim 15, wherein the locking structure comprises a single actuator, and a locking mechanism associated with the portion of each tablet and wherein the causing step includes moving the single actuator linearly causing the locking mechanisms to rotate substantially simultaneously to lock the tablets to the charging station.

18. The method of 17, further comprising:
providing a second charging station, and
powering the second charging station from the first charging station so that only one power cord structure and one power source is required to power the first and second stations.

* * * * *